United States Patent
Yoon et al.

(10) Patent No.: US 11,361,015 B2
(45) Date of Patent: Jun. 14, 2022

(54) APPARATUS AND METHOD FOR CLIPPING AND SHARING CONTENT AT A PORTABLE TERMINAL

(71) Applicant: SAMSUNG ELECTRONICS CO., LTD., Suwon-si (KR)

(72) Inventors: Seung-Hyun Yoon, Anyang-si (KR); Moon-Sang Lee, Yongin-si (KR); Min-soo Koo, Seoul (KR); Ji-In Nam, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/749,422

(22) Filed: Jan. 22, 2020

(65) Prior Publication Data

US 2020/0159763 A1 May 21, 2020

Related U.S. Application Data (63) Continuation of application No. 13/629,394, filed on Sep. 27, 2012, now abandoned.

(30) Foreign Application Priority Data

Sep. 27, 2011 (KR) .................. 10-2011-0097578

(51) Int. Cl.
*G06F 16/44* (2019.01)
*G06F 16/955* (2019.01)

(52) U.S. Cl.
CPC .......... *G06F 16/44* (2019.01); *G06F 16/9562* (2019.01)

(58) Field of Classification Search
CPC .............................. G06F 16/44; G06F 16/9562
See application file for complete search history.

(56) References Cited

U.S. PATENT DOCUMENTS

| | | | |
|---|---|---|---|
| 5,530,865 A | 6/1996 | Owens et al. | |
| 6,976,210 B1 | 12/2005 | Silva et al. | |
| 7,315,848 B2 | 1/2008 | Pearse et al. | |
| 7,343,552 B2 * | 3/2008 | Denoue ................ | G06F 40/169 |
| | | | 715/230 |
| 7,599,950 B2 | 10/2009 | Walther et al. | |
| 7,966,558 B2 | 6/2011 | Duncan et al. | |

(Continued)

FOREIGN PATENT DOCUMENTS

| | | |
|---|---|---|
| CN | 1363906 A | 8/2002 |
| CN | 1771498 A | 5/2006 |

(Continued)

OTHER PUBLICATIONS

Extended European Search Report dated Apr. 2, 2015 in connection with European Patent Application No. 12837007.9; 6 pages.

(Continued)

*Primary Examiner* — Esther B. Henderson
*Assistant Examiner* — Nazia Naoreen
(74) *Attorney, Agent, or Firm* — Sughrue Mion, PLLC (57) ABSTRACT

An apparatus and method for clipping and sharing content at a portable terminal are provided. The method includes receiving a selection of specific content, analyzing related information of the selected content, and classifying the selected content, and storing the classified content according to the classification.

12 Claims, 10 Drawing Sheets

(56) References Cited

U.S. PATENT DOCUMENTS

| | | | |
|---|---|---|---|
| 8,255,819 B2* | 8/2012 | Chang | G06F 16/9535 |
| | | | 715/769 |
| 8,539,336 B2 | 9/2013 | Griffiths et al. | |
| 9,098,597 B2* | 8/2015 | Matas | G06F 16/9577 |
| 2002/0055955 A1* | 5/2002 | Lloyd-Jones | G06F 16/58 |
| | | | 707/E17.026 |
| 2002/0091925 A1 | 7/2002 | Suzuki et al. | |
| 2005/0215246 A1 | 9/2005 | Soderbacka et al. | |
| 2006/0206495 A1 | 9/2006 | Van Gageldonk et al. | |
| 2007/0106952 A1 | 5/2007 | Matas et al. | |
| 2008/0182558 A1 | 7/2008 | Rhee | |
| 2009/0042549 A1 | 2/2009 | Lee | |
| 2009/0254529 A1 | 10/2009 | Goldentouch | |
| 2010/0070501 A1 | 3/2010 | Walsh et al. | |
| 2010/0076784 A1 | 3/2010 | Greenburg et al. | |
| 2012/0066584 A1 | 3/2012 | Jung et al. | |

FOREIGN PATENT DOCUMENTS

| | | |
|---|---|---|
| CN | 1934569 A | 3/2007 |
| CN | 101211341 A | 7/2008 |
| CN | 101414307 A | 4/2009 |
| CN | 101449271 A | 6/2009 |
| EP | 1280077 A2 | 1/2003 |
| JP | 2000-82066 | 3/2000 |
| JP | 2005-522124 | 7/2005 |
| KR | 10-0573037 | 5/2006 |
| KR | 10-2009-0000204 A | 1/2009 |
| KR | 10-2009-0032693 | 4/2009 |
| KR | 10-2009-0089121 A | 8/2009 |
| KR | 20090106122 A | 10/2009 |
| KR | 10-2010-0059553 A | 6/2010 |
| KR | 10-2010-0062789 | 6/2010 |
| WO | 02/059774 A1 | 8/2002 |

OTHER PUBLICATIONS

International Search Report dated Mar. 19, 2013 in connection with International Application No. PCT/KR2012/007721, 3 pages.
Written Opinion of the International Searching Authority dated Mar. 19, 2013 in connection with International Application No. PCT/KR2012/007721, 4 pages.
Seomin Yang et al.: "A New Mobile Content Adaptation Based on Content Provider—Specified Web Clipping", Information Processing Committee 11-B, 1st 90th, Feb. 29, 2004, pp. 35-44.
Communication dated Apr. 5, 2016 issued by the State Intellectual Property Office of P.R. China in counterpart Chinese Patent Application No. 201280047213.9.
Communication dated Feb. 14, 2019, issued by the European Patent Office in counterpart European Application No. 18166497.
Communication dated Feb. 15, 2019, issued by the European Patent Office in counterpart European Application No. 18166488.9.
Communication dated Oct. 18, 2018, issued by the Korean Intellectual Property Office in counterpart Korean Patent Application No. 10-2018-0029643.
Communication dated Apr. 25, 2018, issued by the Korean Intellectual Property Office in corresponding Korean Application No. 10-2018-0029643.
Communication dated Jul. 30, 2018, issued by the European Patent Office in counterpart European Patent Application No. 18166488.9.
Communication dated Aug. 2, 2018, issued by the European Patent Office in counterpart European Patent Application No. 18166497.0.
Communication dated Sep. 18, 2018, issued by the Korean Intellectual Property Office in counterpart Korean Ptaent Application No. 10-2018-0029643.
Communication dated Feb. 19, 2018, issued by the Korean Intellectual Property Office in corresponding Korean Application No. 10-2011-0097578.
Communication dated Jan. 15, 2018, issued by the Korean Intellectual Property Office in corresponding Korean Application No. 10-2011-0097578.
Communication dated Nov. 17, 2016 issued by the State Intellectual Property Office of P.R. China in counterpart Chinese Patent Application No. 201280047213.9.
Communication dated Jun. 1, 2017, issued by the Korean Intellectual Property Office in counterpart Korean application No. 10-2011-0097578.
Communication dated Mar. 16, 2017, issued by the State Intellectual Property Office of P.R. China in counterpart Chinese application No. 201280047213.9.
Communication dated Feb. 26, 2020 from the Korean Patent Office in application No. 10-2018-0141763.
Communication dated Feb. 18, 2020 from the Korean Patent Office in application No. 10-2018-29643.
Communication dated Apr. 22, 2020 from the European Patent Office in application No. 18166488.9.
Communication dated Apr. 24, 2020 from the European Patent Office in application No. 18166497.0.
Communication dated Aug. 6, 2020, issued by the Korean Intellectual Property Office in counterpart Korean Patent Application No. 10-2018-0141763.
Communication dated Feb. 9, 2021 issued by the European Patent Office in application No. 18166497.0.
Communication dated Feb. 11, 2021 issued by the European Patent Office in application No. 18166488.9.
Communication dated Nov. 3, 2021 by the China National Intellectual Property Administration in Chinese Patent Application No. 201810082467.3.

* cited by examiner

```
<?xml version="1.0" encoding="UTF_8"?>
<clip>
  <title>Clip Title</title>
  <app>
    <uid>Application ID</uid>
    <name>Application Name</name>
    <description>Application description</description>
  </app>
  <uid>Clip ID</uid>
  <url>Clip Source URL</url>
  <owner>
    <uuid>User UUID</uuid>
    <account>User account(OpenID)</account>
  </owner>
  <clipBinary>
    <MIMEType>Clip Binary MIME Type</MIMEType>
    <focusOn>
      <width>10</width>
      <height>10</height>
      <leftTopPos>
        <x>5</x>
        <y>5</y>
      </leftTopPos>
    </focusOn>
  </clipBinary>
  <createdDate>2010-12-22T22:43:27Z</createdDate>
  <tags>tag[0],tag[1],tag[2],tag[3],tag[4]</tags>
  <shareLevel>Clip share Level</shareLevel>
  <memo>Manual User Memo</memo>
  <expireDate>UCT for clip experation</expireDate>
  <location>GeoHash</location>
  <summary>text</summary>
</clip>
```

APPARATUS AND METHOD FOR CLIPPING AND SHARING CONTENT AT A PORTABLE TERMINAL

CROSS-REFERENCE TO RELATED APPLICATION(S) AND CLAIM OF PRIORITY

The present application is a Continuation Application of U.S. application Ser. No. 13/629,394 filed Sep. 27, 2012, and is related to and claims the benefit under 35 U.S.C. § 119(a) to a Korean Patent Application No. 10-2011-0097578, filed in the Korean Intellectual Property Office on Sep. 27, 2011, the entire disclosures of the prior applications of which are hereby incorporated by reference in their entirety.

TECHNICAL FIELD OF THE INVENTION

The present invention relates to a clip apparatus and method based on content information of a portable terminal.

BACKGROUND OF THE INVENTION

With the popularization of a smart phone, much data are generated and consumed in a mobile environment. As the kind and amount of data increase, a need for a method for storing specific data generated by a user, so that the user or other people again consume the specific data after the lapse of arbitrary time is being requested.

SUMMARY OF THE INVENTION

To address the above-discussed deficiencies of the prior art, it is a primary object to provide an apparatus and method for clipping and sharing content at a portable terminal capable of clipping specific data, and easily sharing and consuming the clipped data.

Another aspect of the present disclosure is to provide an apparatus and method for designating and clipping a specific portion of a web page that a user is interested in at the portable terminal.

A further aspect of the present invention is to provide an apparatus and method for being capable of consuming clipped data at a portable terminal without a Uniform Resource Locator (URL) as stored data is not limited to URL data.

The above aspects are achieved by providing with an apparatus and method for clipping and sharing content at a portable terminal according to the present disclosure.

According to one aspect of the present disclosure, a method for clipping and sharing content at a portable terminal includes receiving selection of specific content, analyzing related information of the selected content, classifying the selected content, and storing the classified content according to the classification.

According to another aspect of the present invention, an apparatus for clipping and sharing content information at a portable terminal include a decision unit for selecting specific content, a classification unit for analyzing related information of the selected contents and for classifying the selected content, and a storage unit for storing the classified content according to the classification.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or, the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1A through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged. Preferred embodiments of the present invention will be described herein below with reference to the accompanying drawings. In the following description, well-known functions or constructions are not described in detail since they would obscure the invention in unnecessary detail. Also, parts performing like function and operations are denoted by the same symbols throughout the drawings.

Figure 1A:
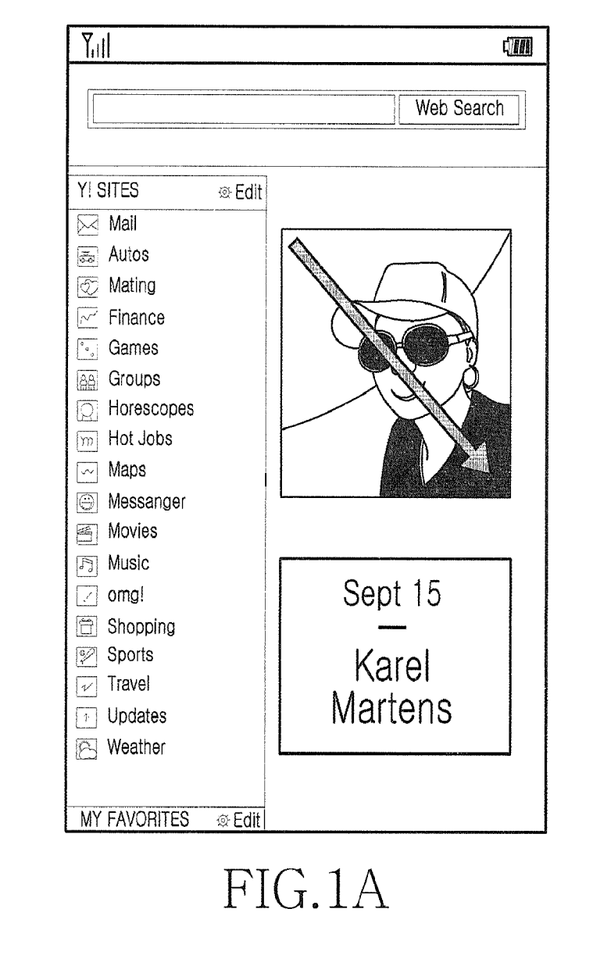
FIGS. 1A and 1B illustrates clipping static data according to one embodiment of the present disclosure.
Figure 1B:
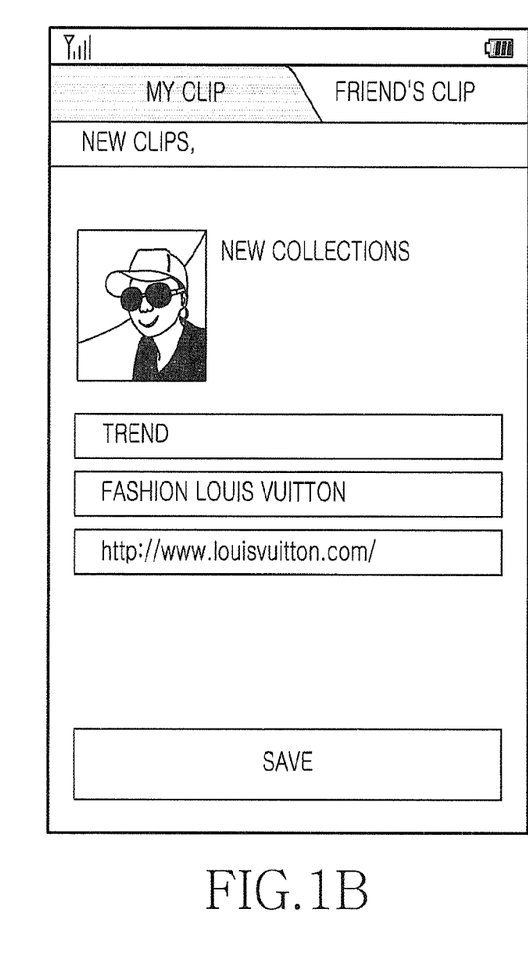

FIGS. 1A and 1B illustrate clipping static data according to one embodiment of the present disclosure. Assume that a jacket and black sunglasses worn by a model in a picture are the latest-style items catching user's fancy while a user who is usually much interested in fashion browses a web page.

The user who intends to purchase the jacket and the black sunglasses reviews information disclosed on the web page so as to obtain items information. In a case where the web page has disclosed the information on the item such as a brand name and a website address, the user can access a related website and obtain detailed information on the interested item. Also, in a case where the web page does not have disclosed the information on the interested item because the web page does not concern the fashion, or in a case where the user wants to simply store the interested item, the user can store the web page and consume stored data later.

In the present disclosure, the user not only can store the website address of the webpage, but also can designate and store a particular portion of the webpage that the user is interested in. As illustrated in FIG. 1A, in a case where the user is interested in only a jacket and black sunglasses worn by a model in a picture, the user can designate and store a specific portion containing the jacket and black sunglasses without storing the whole web page. In certain embodiment, if the user discovers data to clip, the user can begin clipping by pressing a clip button. A pressing the clip button can be performed by selecting a User Interface (UI) icon or gesture which is recognized using a detecting sensor. After that, if the clipping process is begun, the user can designate a portion to clip and perform clipping the specific interesting portion. To designate a portion, the user can use an input tool. Desirably, the user can drag and designate a portion to clip by means of the input tool.

In a case where data to clip is static data such as a web page or a picture, a portion designated by a user is captured in an image file form and is stored in binary data form. Also, a file containing detailed information on clipped data can be stored in an eXtensible Markup Language (XML) data form. In certain embodiments, the file containing detailed information on the clip can be created using not only an XML but also other languages such as a Web Ontology Language (OWL).

In the present disclosure, selected content are automatically classified and is stored based on related information of the selected content. As illustrated in FIG. 1B, once a specific portion is selected by a user, content is automatically classified and is stored by related information of the content. The related information of the content can be categorized into either data information or peripheral information. First, the data information of the content can include a plurality of supplementary information related to data such as a title, an original data Uniform Resource Locator (URL), a maker, a creation date, a category, a publication authority, a user memo, an availability period, Global Positioning System (GPS) information, a data summary, information of an application in which clipping was carried out, the type of clip binary data, the size of a thumbnail image, and a display position.

Except for the user's memo, the related information of the content is automatically input to a portable terminal when the content is selected by the user. In detail, when the user discovers the whole or part of a web page, which can be a specific picture and moving picture, the user designates and selects a portion of the web page. Upon the selection, related information is automatically stored at the portable terminal. For example, as illustrated in FIG. 1B, in a case where the user clips a picture of a model who is wearing a jacket and black sunglasses, the category of "TREND" and the title of "FASHION LOUIS VUITTON" and the original data URL of "http://WWW.LOUISVUITTON.COM" are displayed. Besides that, related information are automatically stored such as an designer of a web page, the date of creating the web page, a publication authority, an availability period, GPS information of an area in which the clipping was carried out, a data summary, information of an application in which the clipping was carried out, the type of clipped binary data, the size of a thumbnail image, and a display position. As described above, in a case where related information does not catch user's fancy, the user can input related information. In a case where the user inputs the related information, the related information input by the user takes priority over the automatically input related information in classifying and storing of the selected content.

The selected content can be classified and be stored using the peripheral information. The peripheral information can include at least one of metadata of the content, text contained in content, and information input by the user. The metadata information, called attribute information is data given to content according to the certain rules for efficient searching and using target information amongst a large amount of information. Metadata can include a position and substance of content, information on a maker, the right conditions, the use conditions and a use specification. In certain embodiments, the user can easily find out his/her own desired specific data (or information) using the metadata by means of a search engine. The functions of the metadata can be extracting movie data in which an actor/actress appearing, picking out only goal-in scenes in a video of a soccer game, and also even editing data. The clipped content is automatically classified and stored using this metadata information. Also, the metadata information has a record of a size or a capacity of the file, so the stored content may be classified by a size or a capacity.

According to one embodiment of the present disclosure text information can be used for automatic classifying and storing of data. When a user can designate a specific portion of a web page and peripheral text information disclosed in the web page can be used for classification. That is, in the embodiment, a selected picture can be classified to the broad level category of fashion as well as be classified to narrow level category by brand name or in alphabetical order of the website address of a product. In the embodiment, the brand names of a jacket and black sunglasses, a model name of the product, and the website address of the product around the picture of a model who is wearing the jacket and the sunglasses can be used for classification. Assume that information of a jacket is disclosed as following: "maker: Louisvuitton, model name: TH-002; size: 44, 55, and 66; price: 800,000 Won; store: Samsung department store; Website address of product: http://WWW.LOUISVUITTON.COM". And information of sunglasses is disclosed as following: "maker: Louisvuitton, model name: T-501; price: 1,000,000 Won; store: Samsung department store; and the Website address of product: http://WWW.LOUISVUITTON.COM". If the user selects a model in a picture who is wearing the jacket and the sunglasses, the selected content is automatically classified to a category of fashion using peripheral text information. In detail, as the information on the jacket, information is automatically input such as the maker 'Louisvuitton', a model name 'TH-002', a selling size '44, 55, and 66', a price '800,000 Won', a current store 'Samsung Department store', and the website address 'http://WWW.LOUISVUITTON.COM' which contains detailed information of the product. Also, as the information on the sunglasses, information is automatically input such as the maker 'Louisvuitton', the model name 'T-501', the price '1,000,000 Won', the current store 'Samsung department store', and the website address of 'http://WWW.LOU- ISVUITTON.COM'. Accordingly, the user can automatically classify and store the selected content using the text information among the peripheral information.

Another example of the peripheral information is information that a user inputs. In a case where information automatically input using the metadata information or text information does not catch user's fancy, the user can input information. For example, when a jacket and sunglasses of a model in a picture is clipped, the clipped jacket and sunglasses can be classified to the different category than the user's intention if the peripheral information have little relationship to the clipped content or irrelevant words have been disclosed as text information around the clipped content. That is, if a tourist destination, traffic information, a tourist attraction, a suggested place have been disclosed in a text around the clipped picture taken during travel, a jacket and sunglasses can be stored in the travel category, although a user intends to store the jacket and sunglasses in the fashion category, not the travel category because he/she is interested in jacket and sunglasses in the clipped picture. Accordingly, the user can delete automatically input peripheral texts and then, input the user memo indicating fashion, classify and store to the fashion category.

In the present disclosure, the selected picture (image data) in which a jacket and black sunglasses worn by a model are the latest-style items catching user's fancy in a browsed web page may be classified into a 'fashion' folder in the portable terminal. Also, goal-in scenes (motion data) in a video of a soccer game in which uniform of a player with new style design having new colors may be classified into the 'fashion' folder. Further, text data with regard to recent fashion related news may be classified into the 'fashion' folder. In this way, there may be a plurality of folders ('fashion', 'movie', 'health' folders) stored in the portable terminal each of which includes a plurality of files. The files may have different file formats as described. Also, the plurality of files having different file formats may be displayed in a display of the portable terminal.

Figure 2A:
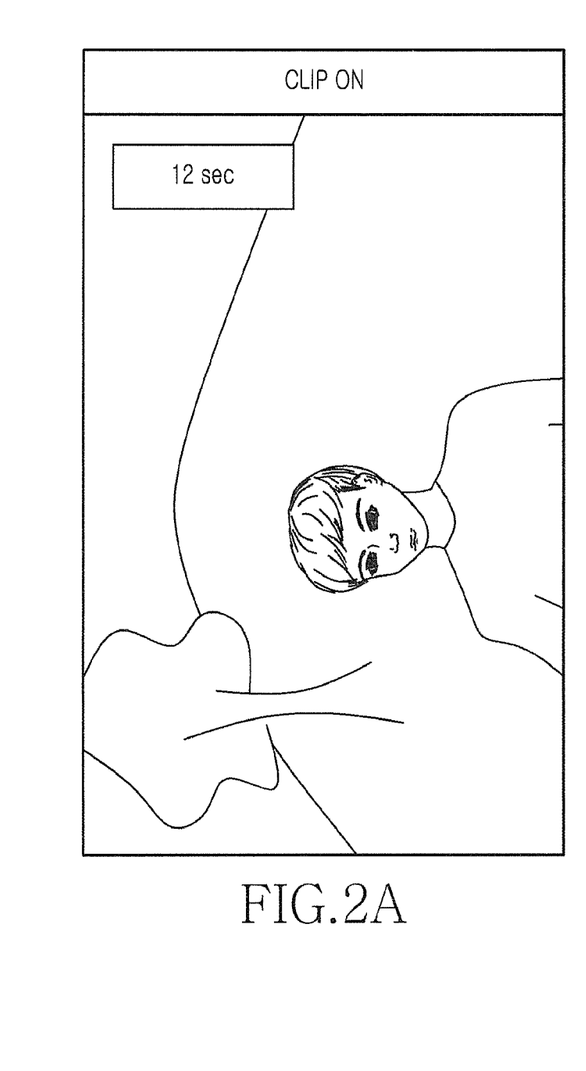
FIGS. 2A and 2B illustrate clipping dynamic data according to one embodiment of the present disclosure.
Figure 2B:
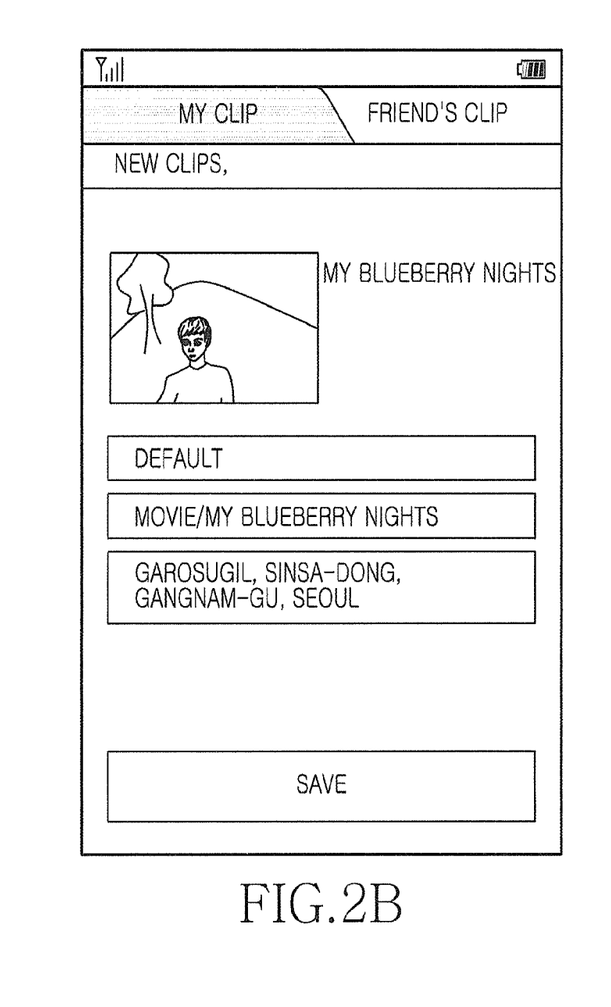

FIGS. 2A and 2B illustrate clipping dynamic data according to one embodiment of the present disclosure. Assuming that, while a user who is usually much interested in a movie browses web pages, the user has discovered a first-run film in which his/her most favorite actor appears. The user can store a close-up video of his/her favorite actor. In detail, the user can preset a specific run time and store data of an arbitrary time period before and after a reference time point of selection in binary data form. That is, as illustrated in FIG. 2A, in a case where the user previously designates a specific run time as 12 seconds, the user can store a video of 12 seconds before and after the reference time point of selection. Accordingly, the video is played from 12 seconds before the selected time point to 12 seconds after the selected time point.

Regarding detailed information on the video, as illustrated in FIG. 2B, a file having detailed information on data is stored in an eXtensible Markup Language (XML) data form. Desirably, a file describing detailed information of the clip can be created using not only an XML but also other languages such as an OWL.

In certain embodiments, selected content is automatically classified and stored based on related information of the selected content. As illustrated in FIG. 2B, if a specific portion is selected by a user, content is automatically classified and stored using related information of selection. The related information of the content can be classified into either data information of the content or peripheral information. The data information of the dynamic data content can include a plurality of supplementary information related to data such as a title, an original data URL, a maker, a creation date, a category, a publication authority, a user memo, an availability period, GPS information, a data summary, information of an application in which clip was carried out, the type of clip binary data, the size of a thumbnail image and a display position. Except for the user memo, the related information of the content are automatically input to a portable terminal when the content is selected by the user. In detail, when the user discovers the whole or part of a web page to clip, which can be a specific picture and moving picture, and the user designates and selects a portion of the web page, content related information is automatically stored in the portable terminal. For example, as illustrated in FIG. 2B, assuming that, during movement, the user searches the previews for a movie in which a user's favorite actor appears. If the user selects a close-up video of his/her favorite actor among the previews for a first-run film, the title of "MY BLUEBERRY NIGHTS" is displayed in the category of "MOVIE", and GPS location information of "Garosugil, Sinsa-dong, Gangnam-gu, Seoul", where GPS signals from GPS satellites were received is stored. Besides that, related information are automatically stored such as a maker who makes a moving picture, a date of creating the moving picture, a publication authority, an availability period, a data summary, information of an application in which clipping is carried out, the type of clipped binary data, the size of a thumbnail image, and a display position. As described above, in a case where related information does not catch user's fancy, the user can input user memo for related information. In a case where the related information is input by the user, the related information input by the user takes priority over the automatically input related information for classifying and storing the clipped content.

As another example of automatic classifying and storing of data, an example using text information can be given. A user can designate a specific portion of web page, and use peripheral text information disclosed in the web page selection. That is if a user selects a close-up video of his/her favorite movie actor, the video can be classified and stored using a movie title, a movie company, names of a movie director, a leading actor and a supporting actor, a screen time, a playing cinema, a Website address introducing a movie, and the like around the moving picture. For example, assume that the following text has been disclosed around the web page in which a moving picture has been uploaded: "title: Bittersweet Life, director: Ji-Un KIM, genre: action, leading actor: Byeong-Heon LEE, supporting actor: Roe-Ha KIM, screen time: 120 minutes, playing cinema: CGV, Website address introducing movie: http://WWW.A BITTERSWEETLIFE.com". In a case where the user being the favor of the actor 'Byeong-Neon LEE' selects the moving picture, the moving picture is automatically input to the main category of 'MOVIE' and a subcategory of 'Byeong-Heon LEE'. As detailed items, the title 'bittersweet life', the director 'Ji-Un KIM', the genre 'action', the screen time '120 minutes', the playing cinema 'CGV', and the related website address 'http://WWW.A BITTERSWEETLIFE.com' are automatically input. Accordingly, the user can automatically classify and store the selected content using the text information among the peripheral information.

Another embodiment according to the present disclosure uses the peripheral information, which a user inputs. In a case where a moving picture of an actor taken in a restaurant has been clipped, and a restaurant shop name and related food have been disclosed, the moving picture can be stored in the food category, although a user intends to store the moving picture in the movie category, not the food category because he/she is interested in the actor in the moving picture. Accordingly, the user may delete the automatically input peripheral text, input the user memo indicating movie category and classify and store the selected moving picture to the movie category.

Although an example of clipping a video of a first-run film has been described in one exemplary embodiment of the present invention, a user can store a preset arbitrary time on a basis of a selected time point for clipping audio data.

In the present disclosure, the selected close-up video (motion data) of actor with preset run time with reference to the reference time point of selection may be classified into the 'movie' folder in a portable terminal. And, the selected content such as audio data in the first-run film may be classified into the 'movie' folder. In this way, there may be a plurality of folders ('movie', 'fashion' 'health' folders) stored in the portable terminal each of which includes a plurality of files. The files may have different file formats as described. Also, the plurality of files having different file formats may be displayed in a display of the portable terminal.

Figure 3A:
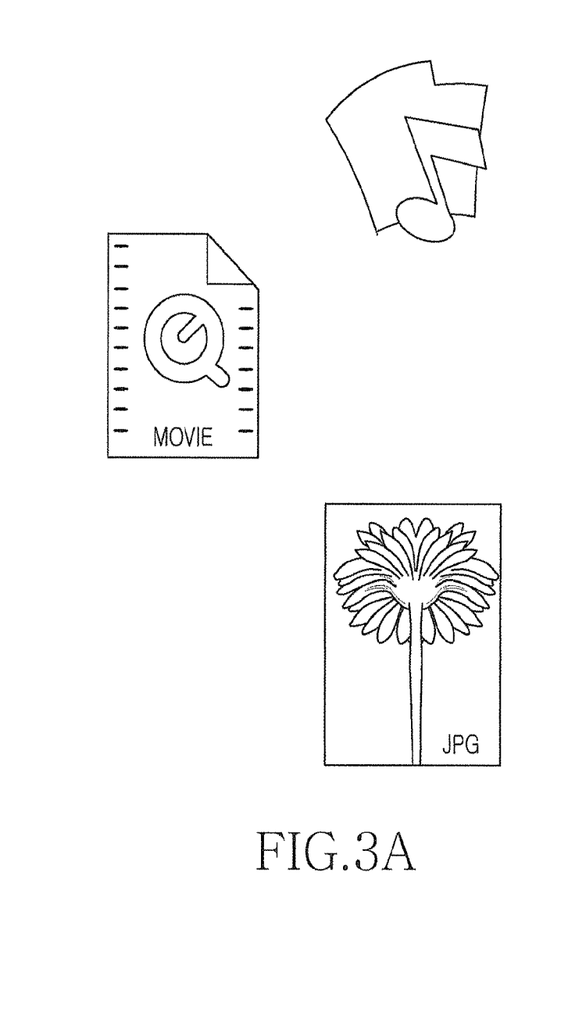
FIGS. 3A and 3B illustrate exemplary binary data and eXtensible Markup Language (XML) data according to one embodiment of the present disclosure.

FIG. 3A illustrates clipped binary data according to one embodiment of the present disclosure. In FIG. 3A, it illustrates the various forms of the files in which clipped binary data are stored after being selected. In detail, if a specific portion of a web page is selected by a user and clipping is performed, clipped content are stored in a binary data and XML data forms. The clipped binary data do not have an extension, so the type of the data cannot be detected. Unlike this, the XML data contain information on the data, so the type of the data can be detected with the XML data. As illustrated in FIG. 3A, the plurality of selected contents such as the motion data, the audio data, and the image data may be stored as the file in the binary data in the folder in the portable terminal according to one embodiment of the present disclosure. These files may have different file formats. There may be a plurality of folders in accordance with the categories such as 'movie', 'fashion' and 'health'.

Figure 3B:
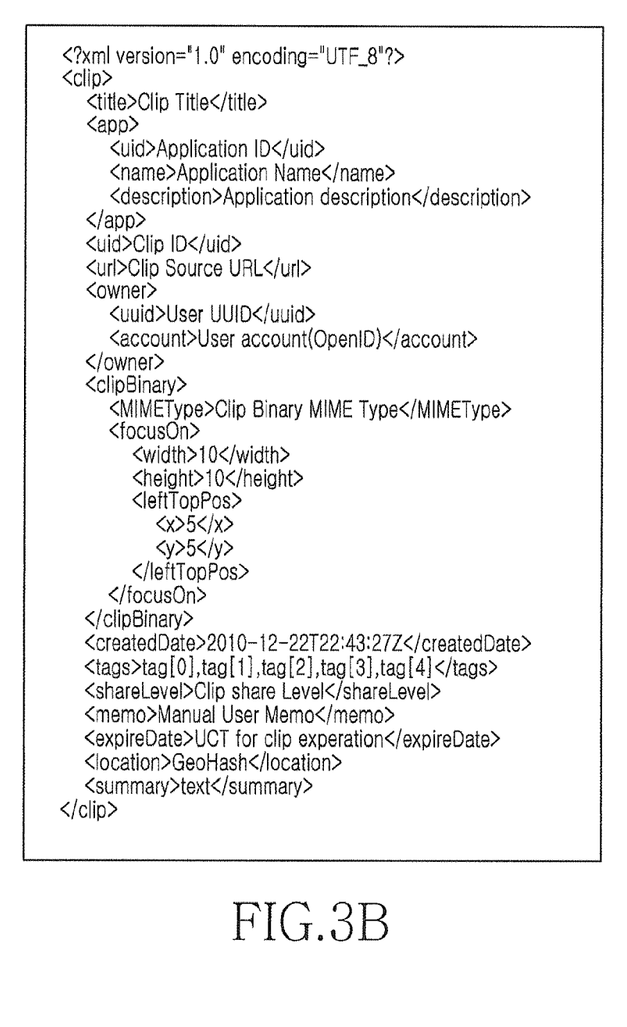

FIG. 3B illustrates exemplary XML data according to one embodiment of the present disclosure. In FIG. 3B, the file containing detail information on data is stored in a XML data form. A file containing detail information of the clip may be created using not only an XML but also other languages such as an OWL. The detail information can include a plurality of supplementary information related to corresponding data such as a title, an original data URL, a maker, a creation date, a category, a publication authority, a user memo, an availability period, GPS information, a data summary, information of an application in which clip is carried out, the kind of clip binary data, the size of a thumbnail image and a display position. Desirably, when being selected, some values among the detailed information are automatically input by a terminal and, if necessary, the user can make a modification for the whole information including the value automatically input by the terminal, or input in detail.

Figure 4A:
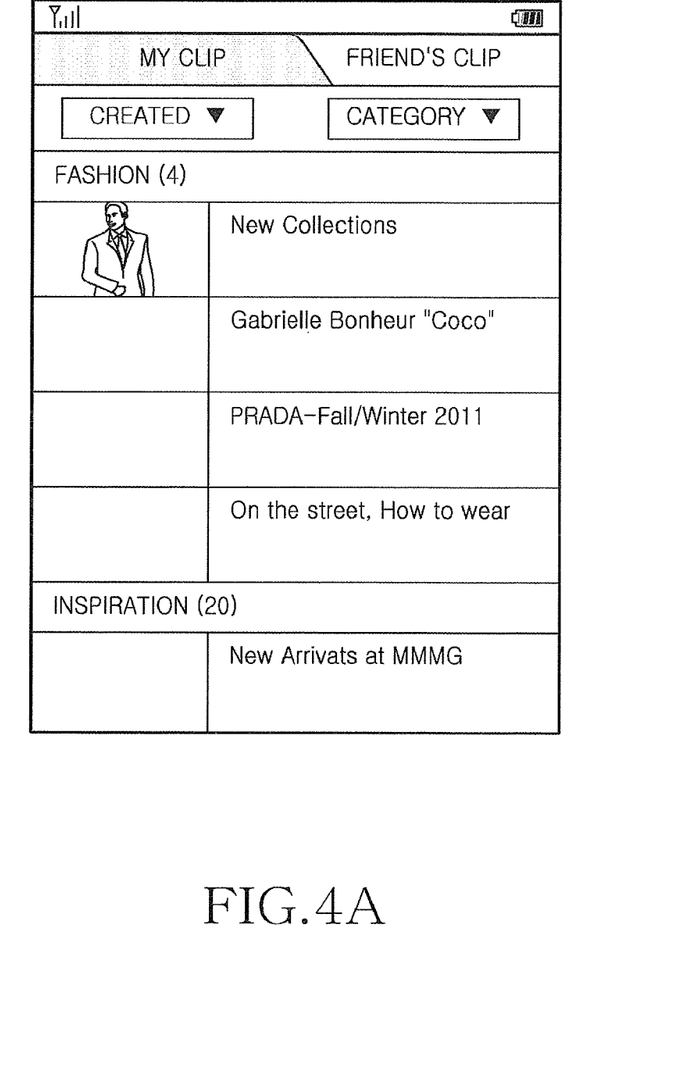
FIGS. 4A to 4D illustrate consuming a generated clip according to one embodiment of the present disclosure.
Figure 4B:
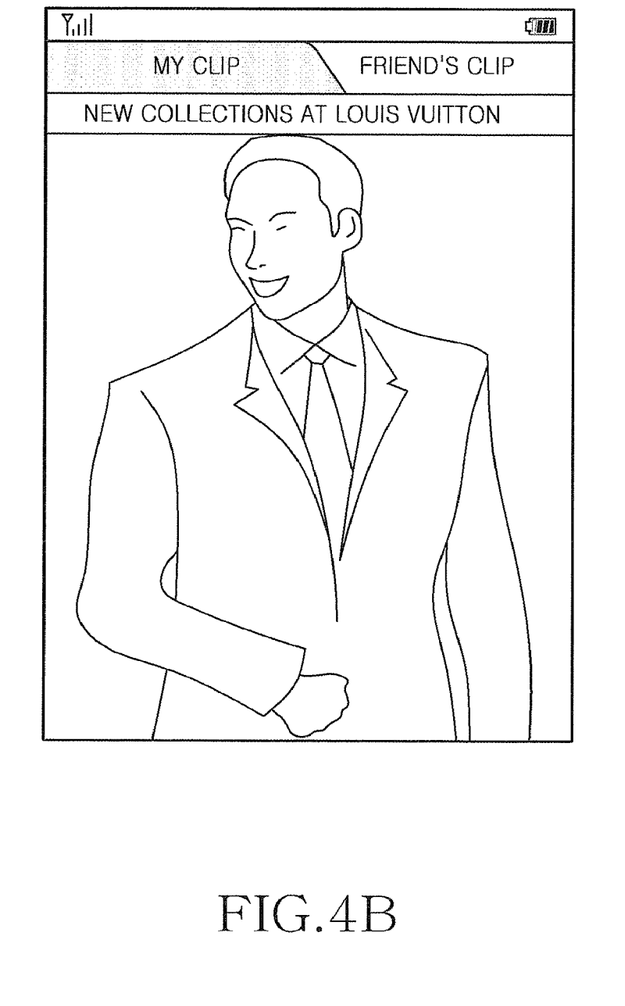
Figure 4C:
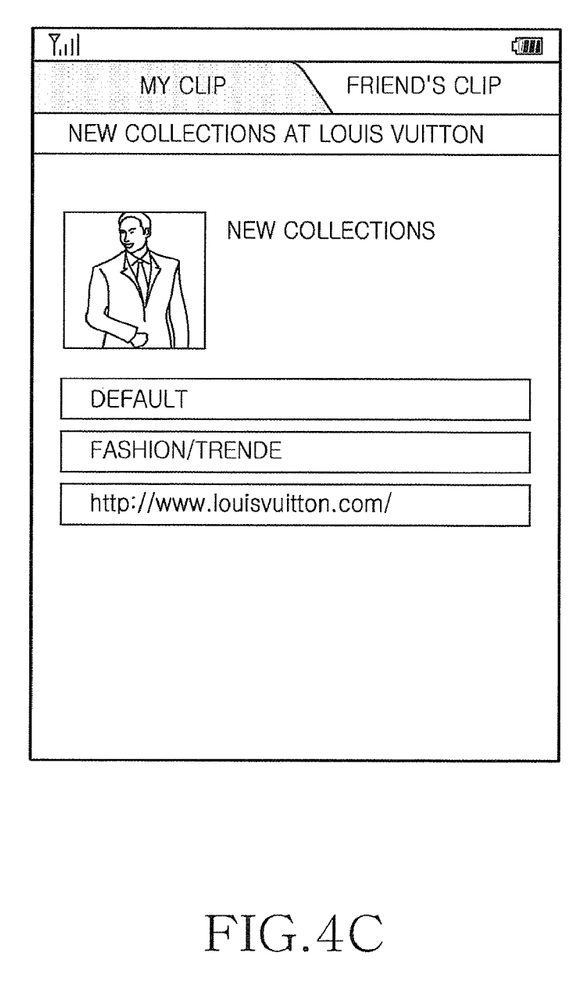
Figure 4D:
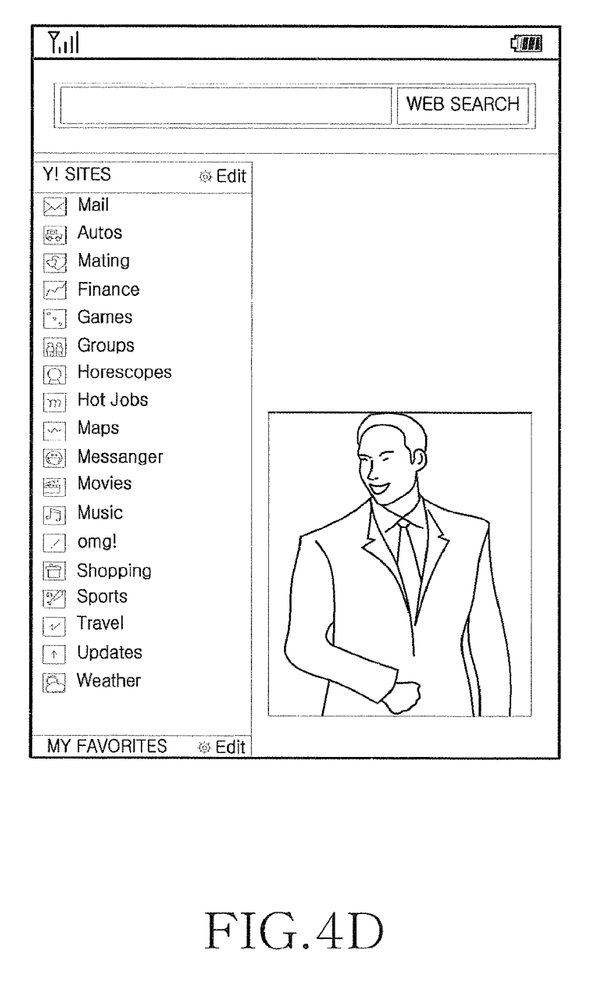

FIGS. 4A to 4D illustrates an example of consuming a generated clip according to an exemplary embodiment of the present invention. Each clipped content has binary data, so the clipped content is providing sufficient information to a user only by itself. In detail, selected and previously stored content are each stored according to a specific criterion. As illustrated in FIG. 4A, each clipped content is captured and displayed in an image file form. Also, detailed information such as each title and clipped time is displayed together with the image file form, so the user can select specific data that the user wants to consume. After that, as illustrated in FIGS. 4B and 4C, if specific data is selected by the user, the user can identify detailed information on the selected data. In detail, FIG. 4B illustrates a case of consuming detailed information of selected data (i.e., a picture) and FIG. 4C illustrates a case of consuming detailed information of selected data. In detail, the detailed information of the selected data is displayed. That is, a title and classification reference (i.e., fashion) of a clipped picture, an address of a website in which a picture is uploaded, comments on a history of a brand, a clipped picture, etc. are displayed. FIG. 4D illustrates an example of accessing an original web page in a case where original URL information of a clip exists within XML data describing detailed information of clipped data. In detail, FIG. 4D illustrates that, in a case where interposed original URL information of a clipped picture exists among the detailed information of FIG. 4C, if the original URL information is selected, it is possible to access a website in which an original picture is interposed.

Figure 5A:
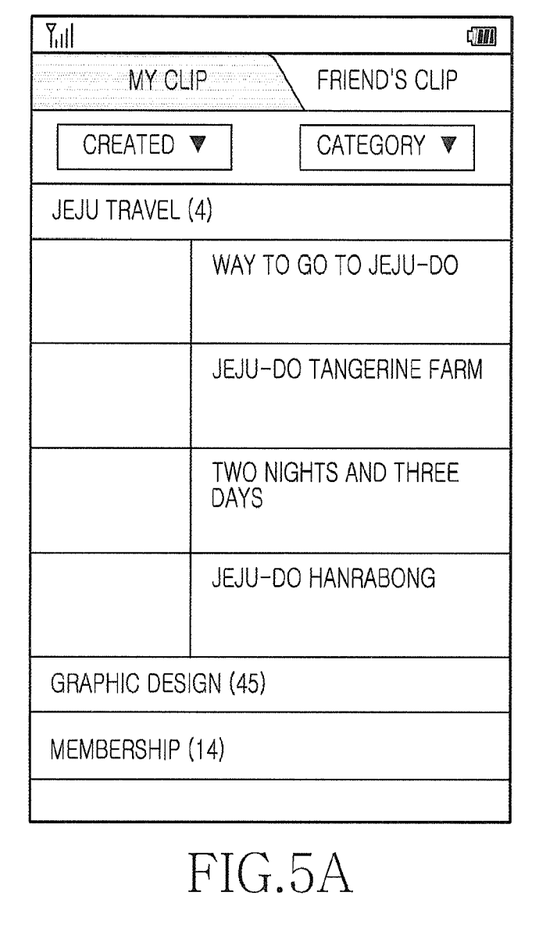
FIGS. 5A and 5B illustrate sharing clipped data of registered friends according to one embodiment of the present disclosure.
Figure 5B:
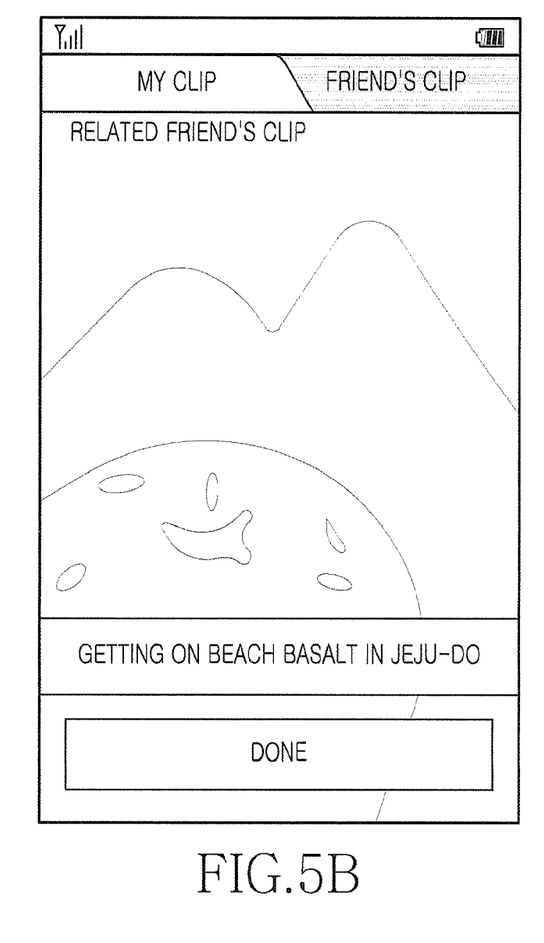

FIGS. 5A and 5B illustrate one embodiment of sharing clipped data with registered friends according to the present disclosure. As illustrated in FIG. 5A, if a user searches for clipped data about Jeju-do travel, the clipped data related to the Jeju-do travel are displayed by title or date. In FIG. 5B, if the user searches friend's clipped data and selects interested data, the user can consume the selected picture or moving picture. In detail, the user can store the clipped data in his/her own terminal, and transmit the stored data to a server by user's selection. The thus transmitted data is automatically updated at the server, and the updated data are again transmitted to other users' terminals upon the users' requests. That is, the server searches for and provides the clips corresponding to the same category among clips of users and registered friends. In certain embodiments, if the user wants to receive the data about the Jeju-do travel which are clipped by the friends, the user can select the corresponding category (i.e., Jeju-do travel), receive and consume data which are clipped during the Jeju-do travel of the friends.

The criterion for searching for content can include not only the same category but also the similarity of GPS information. In certain embodiment, if data have been clipped in the Jeju-do area, the user can search for the data clipped by friends using the GPS information. That is, the user can not only search a category 'Jeju-do travel' but also can search using GPS location information of Jeju-do and share content relating to Jeju-do travel clipped by the friends.

Figure 6:
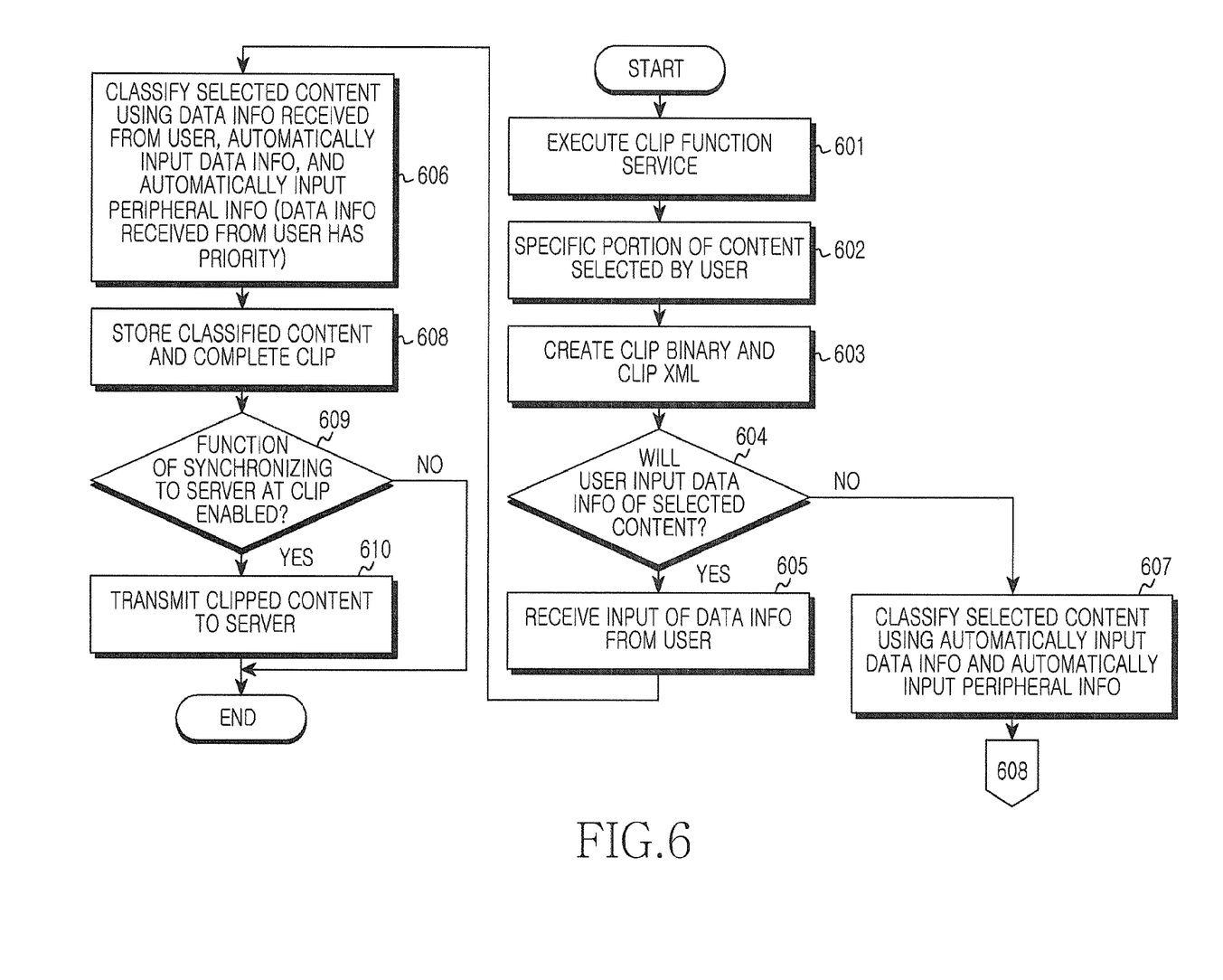
FIG. 6 is a flowchart illustrating a method for clipping content at a portable terminal according to an one embodiment of the present disclosure.

FIG. 6 is a flowchart illustrating a method for clipping content at a portable terminal according to one embodiment of the present disclosure. As illustrated in FIG. 6, in a case where the user discovers a picture, a moving picture or a sound source to clip and to store, the user executes an application S/W providing with a clip function (step 601). After that, the user designates a specific portion to clip, and performs the clipping. That is, a specific portion of content is selected by the user (step 602). In certain embodiments, if the user discovers data to clip, the user can begin clipping by pressing a clip button. The behavior of pressing the clip button can be replaced with other behaviors of forwarding a user's clipping intention such as selecting a UI icon or gesture which can be recognized by using a sensor. For detailed portion designation, the user can designate a portion using an input tool. Desirably, the user can drag and designate a portion to clip by means of the input tool.

If the user designates the specific portion to clip and performs clipping, clipped binary data and XML data are created (step 603). In certain embodiments, in a case where data to clip is static data such as a web page or a picture, the portion designated by the user is captured in an image file form and is stored in a binary data form. In a case where data is dynamic data such as a moving picture and a currently playing sound source, the user can preset a specific time period and store, in binary data form, data for the preset time period before and after a reference time point of selection. Also, a file containing detailed information on data can be stored in a XML data form. Desirably, a file containing detailed information of clipped data may be created using not only an XML but also other languages such as an OWL.

After that, the terminal inquires if the user will input data information of the selected contents (step 604). If the user will input the data information of the selected contents (step 604), the terminal receives the input of the data information from the user (step 605) and then, classifies the selected content using the user input data information, automatically input data information, and automatically input peripheral information (step 606). The content data information can include a plurality of supplementary information related to data such as a title, an original data URL, a maker, a creation date, a category, a publication authority, a user memo, an availability period, GPS information, a data summary, information of an application in which clipping was carried out, the type of clip binary data, the size of a thumbnail image, and a display position. Except for the user memo, the related information of the content is automatically input to a portable terminal when the content is selected by the user. In certain embodiments, when the user discovers the whole or part of a web page to clip, a specific picture and moving picture while the user searches content, the user designates and selects a portion, and contents related information is automatically stored in the portable terminal. Among the contents data information, the user memo is input, not automatically, by the user. Also, the user may input the contents data information.

If the content data information is input by the user, the contents data information input by the user takes priority over automatically stored data information. If the user does not input the data information in the inquiry process (step 604), the terminal classifies the selected content using the automatically input data information and automatically input peripheral information (step 607). The peripheral information can include at least one of metadata information of the selected content, text information of the selected content and information input by the user.

If the selected contents are classified, the terminal stores the classified contents and completes the clipping (step 608). If the content is stored in the terminal, the portable terminal determines if synchronizing function to a server upon clipping will be enabled (step 609). In certain embodiment, the portable terminal can transmit to the server on every clipping events through an inquiry of the user as to whether to transmit to the server, or can automatically transmit to the server by a preset value. For example, the terminal can either transmit to the server automatically on every clippings, transmit periodically to the server, transmit to the server at a defined time, or transmit to the server when a specific condition is satisfied. That is, transmitting periodically to the server represents transmitting to the server every one hour after storing clipped data. Transmitting to the server at the defined time represents transmitting to the server at 24:00 pm every day. Transmitting to the server when the specific condition is satisfied desirably represents transmitting to the server upon connection to the network including wireless fidelity (Wifi).

If it is determined in the determination process (step 609) that the function of synchronizing to the server is enabled, the terminal transmits clipped content to the server (step 610) and terminates all of the processes. If it is determined in the determination process (step 609) that the function of synchronizing to the server has not been enabled, the terminal can terminate the process without transmitting the clipped content to the server.

The method described above in relation with FIG. 6 under of the present invention may be provided as one or more instructions in one or more software modules, or computer programs stored in an electronic device including a portable terminal. The present invention may be implemented in an electronic device including a portable terminal such as, for example, a smart phone and a mobile telecommunication terminal. Hereunder, a portable terminal is used as an example for the electronic device.

Figure 7:
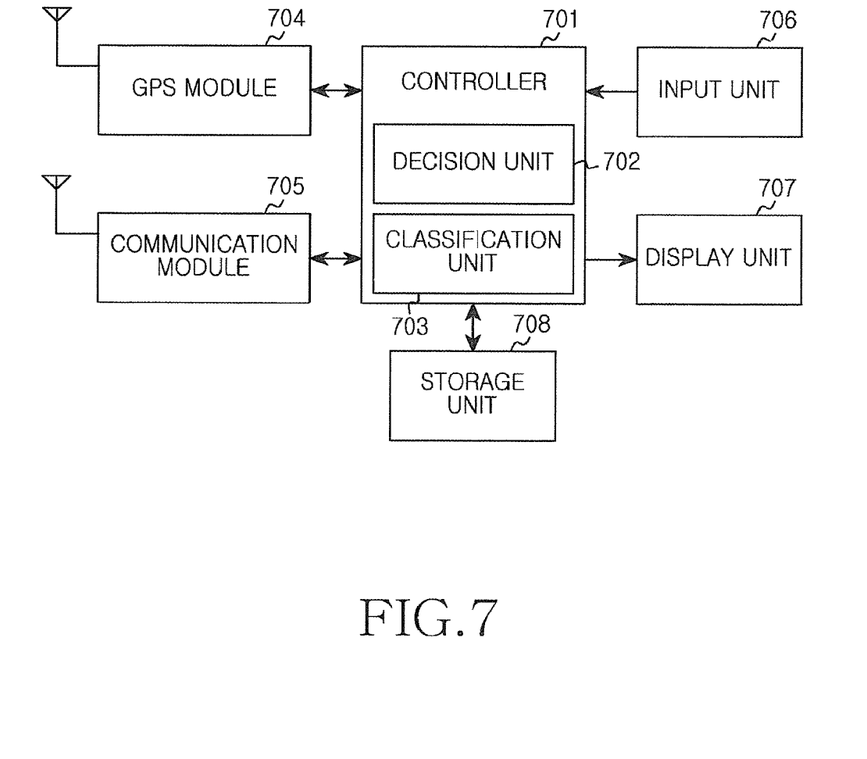
FIG. 7 is a block diagram illustrating an apparatus for clipping and sharing content at a portable terminal according to an one embodiment of the present disclosure.

FIG. 7 is a block diagram illustrating a configuration of a clip apparatus based on content data information of a portable terminal according to an exemplary embodiment of the present invention. As illustrated in FIG. 7, the clip apparatus according to the present disclosure can include a controller 701, a decision unit 702, a classification unit 703, a GPS module 704, a communication module 705, an input unit 706, a display unit 707, and a storage unit 708.

The controller 701 controls the general operation of the portable terminal. In certain embodiments, the controller 701 can include the decision unit 702 and the classification unit 703.

The decision unit 702 is provided within the controller 701, and clips content and inquires if the user will input data information. For example, the decision unit 702 selects the whole or part of the specific content, inquires if the user will input data information for the selected content, and determines if it is preset to transmit the selected content to the server. Also, the decision unit 702 sends the server a request for content stored in the server, and sends to a preset different portable terminal a request for content which corresponds to the same category as that of the portable terminal and is stored in the different portable terminal.

The classification unit 703 automatically classifies the selected content. In the embodiment, the classification unit 703 analyzes related information of the selected content, classifies the selected content, and analyzes data information of the selected content and peripheral information. Also, if the classification unit 703 receives an input of the data information from the user, the classification unit 703 analyzes the data information received from the user, automatically input data information, and the peripheral information of the content, and classifies the selected content based on the analysis. If the user does not input the data information, the classification unit 703 analyzes the automatically input data information and the peripheral information of the content and classifies the selected content.

The GPS module 704 can provides with location information of a terminal upon clipping the content, and the location information can be used as supplementary information for classification. In certain embodiments, if clipped data are stored in the Jeju-do area, the GPS module 704 can inquire data which are stored at friend mobile terminals using GPS information among the supplementary information. That is, the user not only searches a category of 'Jeju-do travel', but also may search using GPS location information fitting to the Jeju-do area and share the clipped content.

The communication module 705 processes a signal transmitted/received through an antenna for voice and data communication. In certain embodiments, if it is preset to transmit stored content to a server, the communication module 705 transmits the content to the server according to the preset mode including transmitting the content to the server whenever the contents are stored, transmitting the content to the server every preset time, or transmitting the contents to the server upon meeting preset conditions. Also, the communication module 705 receives contents corresponding to the same category from other portable terminals, receives a request for content corresponding to the same category as that of a portable terminal from a preset different portable terminal, and transmits the content corresponding to the same category to the other portable terminals.

The input unit 706 provides with input command which is generated by user's selection to the controller 701. In certain embodiment, if an application S/W providing with a clip function is opened, the input unit 706 receives an input command of executing a clip function.

The display unit 707 displays status information of the portable terminal, menu screen and story information by the control of the controller 701. For instance, the display unit 707 can include a touch screen.

The storage unit 708 can include a program storage unit and a data storage unit. The program storage unit stores a program for controlling an operation of the portable terminal. The data storage unit stores data generated in execution of a program. In certain embodiment, the storage unit 708 stores classified content and, in a case where selected content is sound source or moving picture data, the storage unit 708 stores data during a preset arbitrary time period before and after a time point at which data is selected.

In the aforementioned embodiments, the controller 701 can perform the general function of the terminal. In the present disclosure, general functions are separately described in order to distinguish other functions. Thus, when a product is actually realized, the controller 701 can process all of the functions of the terminal, or the controller 701 can process only some of the functions.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for managing contents at an electronic device, the method comprising:
    displaying a webpage in which a content is displayed;
    in response to obtaining at least a portion of the content, automatically identifying information associated with the content based on first data displayed around the content in the webpage and second data including metadata of the content;
    identifying a user annotation for the content received after the obtaining the at least the portion of the content as the information associated with the content, the user annotation being on the webpage;
    in response to the identifying, automatically generating a mark-up language file associating the obtained at least the portion of the content with the information associated with the content including the user annotation, wherein the mark-up language file includes another annotation information associating the obtained at least the portion of the content with at least one of the information associated with the content including the user annotation;
    classifying the mark-up language file based on at least one of the information associated with the content including the user annotation;
    storing the classified mark-up language file and a content file including the obtained at least the portion of the content together; and
    transmitting the stored mark-up language file and the stored content file, to a server,
    wherein the transmitting the stored mark-up language file and the stored content file comprises one of:
        in response to storing the mark-up language file and the content file, automatically transmitting the stored mark-up language file and the content file, to the server:
        periodically transmitting the stored mark-up language file and the content file, to the server based on a preset interval; and
        in response to establishing a connection between the server and the electronic device via a wireless fidelity (WIFI), transmitting the stored mark-up language file and the content file, to the server.

2. The method of claim 1, wherein the information associated with the content comprises at least one of a title of the content, an original data Uniform Resource Locator (URL), a maker of the content, a creation date of the content, a category of the content, a publication authority of the content, an availability period of the content, Global Positioning System (GPS) information associated with the content, a data summary of the content, a thumbnail image size of the content, and a display position of the content.

3. The method of claim 1, wherein, if the content displayed in the webpage is sound data or moving picture data, the obtained at least the portion of the content corresponds to a preset arbitrary time period before and after at a time point when the content is selected.

4. The method of claim 1, further comprising:
sharing the stored mark-up language file and the content file with another electronic device through a server.

5. The method of claim 1, further comprising:
sending, to a server, a request for receiving at least one file, the at least one file transmitted from another electronic device to the server, and associated with one or more of the stored mark-up language file or the content file; and
receiving the at least one file from the server.

6. The method of claim 1, further comprising:
in response to an input, displaying the obtained at least the portion of the content and the information associated with the content including the user annotation together, by using the stored mark-up language file.

7. An electronic device for managing content, the device comprising:
at least one display;
at least one memory configured to store instructions;
at least one communication circuitry; and
at least one processor operatively coupled with the at least one display, the at least one memory, and the at least one communication circuitry, and configured to execute the instructions to:
display a webpage in which a content is displayed;
in response to obtaining at least a portion of the content, automatically identify information associated with the content based on first data displayed around the content in the webpage and second data including metadata of the content;
identify a user annotation for the content received after the obtaining the at least the portion of the content as the information associated with the content, the user annotation being on the webpage;
in response to the identifying, automatically generate a mark-up language file associating the obtained at least the portion of the content with the information associated with the content including the user annotation, wherein the mark-up language file includes another annotation information associating the obtained at least the portion of the content with at least one of the information associated with the content including the user annotation;
classify the mark-up language file based on at least one of the information associated with the content including the user annotation;
store the classified mark-up language file and a content file including the obtained at least the portion of the content together; and
transmitting the stored mark-up language file and the stored content file, to a server,
wherein the at least one processor is further configured to execute the instructions to:
in response to storing the mark-up language file and the content file, automatically transmit the stored mark-up language file and the content file, to the server;
periodically transmit the stored mark-up language file and the content file, to the server based on a preset interval; or
in response to establishing a connection between the server and the electronic device via a wireless fidelity (WIFI), transmit the stored mark-up language file and the content file, to the server.

8. The device of claim 7, wherein the information associated with the content comprises at least one of a title of the content, an original data Uniform Resource Locator (URL), a maker of the content, a creation date of the content, a category of the content, a publication authority of the content, an availability period of the content, Global Positioning System (GPS) information associated with the content, a data summary of the content, a thumbnail image size of the content, and a display position of the content.

9. The device of claim 7, wherein, if the content displayed in the webpage is sound data or moving picture data, the obtained at least the portion of the content corresponds to a preset arbitrary time period before and after at a time point when the content is selected.

10. The device of claim 7, wherein the at least one processor is further configured to execute the instructions to:
share the stored mark-up language file and the content file with another electronic device through a server.

11. The device of claim 7, wherein the at least one processor is further configured to execute the instructions to:
send, to a server, a request for receiving at least one file, the at least one file transmitted from another electronic device to the server, and associated with one or more of the stored mark-up language file or the content file; and
receive the at least one file from the server.

12. The device of claim 7, wherein the at least one processor is further configured to execute the instructions to:
in response to an input, display the obtained at least the portion of the content and the information associated with the content including the user annotation together, by using the stored mark-up language file.

* * * * *